United States Patent
Kataoka et al.

(10) Patent No.: US 11,685,428 B2
(45) Date of Patent: Jun. 27, 2023

(54) STEERING CONTROL DEVICE

(71) Applicant: JTEKT CORPORATION, Osaka (JP)

(72) Inventors: Nobuaki Kataoka, Okazaki (JP);
Takahiro Toko, Takahama (JP);
Takafumi Yamaguchi, Kuwana (JP);
Yukinobu Ezaki, Kasugai (JP)

(73) Assignee: JTEKT CORPORATION, Kariya (JP)

( * ) Notice: Subject to any disclaimer, the term of this patent is extended or adjusted under 35 U.S.C. 154(b) by 319 days.

(21) Appl. No.: 17/007,017

(22) Filed: Aug. 31, 2020

(65) Prior Publication Data
US 2021/0070351 A1   Mar. 11, 2021

(30) Foreign Application Priority Data

Sep. 10, 2019   (JP) .............................. JP2019-164431

(51) Int. Cl.
*B62D 5/04* (2006.01)
*B62D 6/00* (2006.01)

(52) U.S. Cl.
CPC ........... *B62D 5/0463* (2013.01); *B62D 6/008* (2013.01)

(58) Field of Classification Search
None
See application file for complete search history.

(56) References Cited

U.S. PATENT DOCUMENTS

| | | | |
|---|---|---|---|
| 6,112,846 A | | 9/2000 | Mukai et al. |
| 2016/0068081 A1* | | 3/2016 | Li ...................... H02P 23/0004 701/22 |
| 2017/0197654 A1* | | 7/2017 | Kim ...................... B62D 5/0463 |
| 2017/0240201 A1* | | 8/2017 | Kim ........................ B62D 15/02 |
| 2018/0057043 A1 | | 3/2018 | Toko et al. |
| 2018/0167004 A1* | | 6/2018 | Suzuki ...................... H02P 6/28 |
| 2018/0194389 A1* | | 7/2018 | Imamura ............... B62D 5/0469 |
| 2018/0346018 A1 | | 12/2018 | Kataoka et al. |

(Continued)

FOREIGN PATENT DOCUMENTS

| CN | 108516012 A | * | 9/2018 | ........... B62D 5/0466 |
|---|---|---|---|---|
| JP | 2011102093 A | * | 5/2011 | |

(Continued)

OTHER PUBLICATIONS

Feb. 4, 2021 Search Report issued in European Patent Application 20194099.6.

*Primary Examiner* — Anne Marie Antonucci
*Assistant Examiner* — Amelia Vorce
(74) *Attorney, Agent, or Firm* — Oliff PLC

(57) ABSTRACT

A steering control device includes a control circuit and a drive circuit. The control circuit is configured to perform a current feedback computation by which the actual current value of electric current to be supplied to a motor follows a current command value. The control circuit is configured to execute an end-abutting relaxation control to correct the current command value such that decrease in an end interval angle is restricted, when the end interval angle is equal to or smaller than a predetermined angle, the end interval angle indicating the distance of the absolute steer angle from the end position correspondence angle. The control circuit is configured to adjust a control gain to be used in the current feedback computation, such that the control gain increases, when overshoot of the actual current value occurs during the execution of the end-abutting relaxation control.

7 Claims, 6 Drawing Sheets

(56) References Cited

U.S. PATENT DOCUMENTS

2019/0126981 A1* 5/2019 Goering ................ G05D 1/021
2020/0346687 A1* 11/2020 Sakaguchi ......... B62D 15/0235
2021/0245800 A1* 8/2021 Kitazume ............ B62D 5/0469

FOREIGN PATENT DOCUMENTS

| JP | 2015-020506 A | 2/2015 |
| JP | 5962881 B1 | 8/2016 |

* cited by examiner

STEERING CONTROL DEVICE

CROSS-REFERENCE TO RELATED APPLICATION

This application claims priority to Japanese Patent Application No. 2019-164431 filed on Sep. 10, 2019, incorporated herein by reference in its entirety.

BACKGROUND

1. Technical Field

The present disclosure relates to a steering control device.

2. Description of Related Art

As a vehicle steering device, an electric power steering device (EPS) including an actuator that uses a motor as a drive source is known. Some kinds of EPSs acquire the steering angle of a steering wheel as an absolute value having a range beyond 360°, and perform various controls based on the steering angle. As an example of the controls, Japanese Unexamined Patent Application Publication No. 2015-20506 (JP 2015-20506 A) and Japanese Patent No. 5962881 disclose EPSs each of which executes an end-abutting relaxation control for relaxing impact of so-called end abutting in which a rack end that is an end portion of a rack shaft abuts on a rack housing, for example. The EPS in JP 2015-20506 A relaxes the impact of the end abutting, by correcting a current command value corresponding to a target value of motor torque to be output by a motor, using a steering reaction component based on the steering angle. The EPS in Japanese Patent No. 5962881 relaxes the impact of the end abutting, by limiting the current command value corresponding to the target value of the motor torque to be output by the motor, to a value that is equal to or smaller than a limit value based on the steering angle.

SUMMARY

For example, in the case where a driver performs steering on a low-friction road at high speed, the rack end sometimes collides with the rack housing, even when the end-abutting relaxation control is executed similarly to the above configurations. In this case, the motor rotating at high speed stops suddenly, and therefore the reverse voltage generated in the motor decreases rapidly. The decrease in the reverse voltage is earlier than the decrease in a voltage command value due to the decrease in the current command value. Therefore, voltage is temporarily applied to the motor, resulting in occurrence of overshoot in which the actual current value of electric current that is supplied to the motor becomes larger than the current command value. As a result, the impact of the end abutting cannot be sufficiently relaxed, so that load on component parts of the steering device can increase.

The present disclosure provides a steering control device that can restrain the overshoot of the electric current that is supplied to the motor.

A steering control device according to an aspect of the present disclosure includes a control circuit and a drive circuit. The control circuit is configured to control a steering device and output a motor control signal, the steering device including a housing, a turning shaft contained in the housing so as to be capable of reciprocating, and an actuator configured to give motor torque by which the turning shaft reciprocates using a motor as a drive source. The control circuit is configured to detect an absolute steer angle that is indicated by an absolute angle having a range beyond 360°, the absolute steer angle being the rotation angle of a rotation shaft and being capable of being converted into the turning angle of a turning wheel that is coupled to the turning shaft. The control circuit is configured to compute a current command value corresponding to a target value of the motor torque to be output by the motor. The control circuit is configured to perform a current feedback computation by which the actual current value of electric current to be supplied to the motor follows the current command value. The control circuit is configured to generate the motor control signal. The control circuit is configured to store an end position correspondence angle associated with the absolute steer angle, the end position correspondence angle being an angle indicating an end position where movement of the turning shaft is restricted by end abutting in which the turning shaft abuts on the housing. The control circuit is configured to execute an end-abutting relaxation control to correct the current command value such that decrease in an end interval angle is restricted, when the end interval angle is equal to or smaller than a predetermined angle, the end interval angle indicating the distance of the absolute steer angle from the end position correspondence angle. The control circuit is configured to adjust a control gain to be used in the current feedback computation, such that the control gain increases when overshoot of the actual current value occurs during the execution of the end-abutting relaxation control. The drive circuit is configured to supply drive electric power to the motor based on the motor control signal.

With the steering control device according to the aspect of the present disclosure, when the overshoot of the actual current value occurs during the execution of the end-abutting relaxation control, the control gain increases. Thereby, the responsiveness of the actual current value to the current command value becomes high, and therefore it is possible to restrain the overshoot of the electric current that is supplied to the motor.

In the steering control device according to the aspect of the present disclosure, the control circuit may be configured to compute a steer angle limit value that decreases based on the decrease in the end interval angle, when the end interval angle is equal to or smaller than the predetermined angle. The control circuit may be configured to set a limit value that is an upper limit of the absolute value of the current command value, to a value that is equal to or smaller than the steer angle limit value. The control circuit may be configured to execute the end-abutting relaxation control by limiting the absolute value of the current command value to the steer angle limit value.

With the steering control device according to the aspect of the present disclosure, it is possible to restrain the overshoot of the actual current value, when the end-abutting relaxation control is executed in a manner in which the absolute value of the current command value is limited to the steer angle limit value. In this configuration, even when the current command value is limited to a maximum extent, the absolute value of the current command value is only zero at most. Therefore, the effect of the restraint of the overshoot through the adjustment of the control gain is high.

In the steering control device according to the aspect of the present disclosure, the control circuit may be configured to determine that the overshoot of the actual current value occurs, and adjust the control gain such that the control gain increases, when an adjustment start condition is satisfied during the execution of the end-abutting relaxation control, the adjustment start condition including a condition that the absolute value of a current deviation between the current command value and the actual current value is equal to or larger than a preset first current deviation threshold.

With the steering control device according to the aspect of the present disclosure, it is possible to exactly determine the occurrence of the overshoot of the actual current value, by performing comparison in magnitude between the current deviation and the first current deviation threshold. In the steering control device according to the aspect of the present disclosure, the adjustment start condition may include a condition that the absolute value of the angular velocity of the motor is equal to or larger than a preset angular velocity threshold, in addition to the condition that the absolute value of the current deviation is equal to or larger than the first current deviation threshold.

With the steering control device according to the aspect of the present disclosure, it is possible to exactly perceive the case where the actual current value overshoots due to the occurrence of the end abutting, and to increase the control gain, and it is possible to suitably restrain the overshoot. In the steering control device according to the aspect of the present disclosure, the adjustment start condition may include a condition that the absolute value of the angular velocity change amount of the motor is equal to or larger than a preset angular velocity change amount threshold, in addition to the condition that the absolute value of the current deviation is equal to or larger than the first current deviation threshold.

With the steering control device according to the aspect of the present disclosure, it is possible to exactly perceive the case where the actual current value overshoots due to the occurrence of the end abutting, and to increase the control gain, and it is possible to suitably restrain the overshoot. In the steering control device according to the aspect of the present disclosure, the control circuit may be configured to cancel the adjustment of the control gain, when a cancellation condition is satisfied after the control circuit adjusts the control gain such that the control gain increases.

When the control gain increases and thereby the responsiveness of the actual current value to the current command value becomes high, the motor sensitively reacts to, for example, a slight change in the current command value, so that vibration or abnormal noise can be generated. In this regard, when the cancellation condition is satisfied, the steering control device according to the aspect of the present disclosure cancels the state where the control gain is large, that is, the state where the responsiveness is high. Therefore, it is possible to restrain the control gain from being kept large, when a high responsiveness is unnecessary due to reduction in the overshoot of the actual current value, and it is possible to restrain the generation of vibration or abnormal noise.

In the steering control device according to the aspect of the present disclosure, the cancellation condition may include a condition that the absolute value of the current deviation is equal to or smaller than a preset second current deviation threshold that is smaller than the first current deviation threshold.

With the steering control device according to the aspect of the present disclosure, it is possible to restrain the adjustment of the control gain from being cancelled in a state where the overshoot of the actual current value is large. In the steering control device according to the aspect of the present disclosure, the cancellation condition may include a condition that a state where the control gain is large continues for a predetermined time.

The overshoot of the actual current value is caused not only by a rapid decrease in reverse voltage due to a sudden stop of the motor, but also by a delay of the response of the actual current value to a rapid decrease in the current command value due to the execution of the end-abutting relaxation control. When the adjustment start condition is satisfied due to the overshoot caused by the responsiveness of the actual current value, the control gain is adjusted so as to increase, and thereby the overshoot can be restrained. The overshoot caused by the responsiveness of the actual current value occurs at the time when the current command value has decreased due to the execution of the end-abutting relaxation control, and the overshoot caused by the decrease in reverse voltage occurs after the motor has stopped due to the end abutting. Accordingly, assuming that the end abutting occurs during the execution of the end-abutting relaxation control, the absolute value of the current deviation decreases once after the occurrence of the overshoot caused by the responsiveness of the actual current value, and then the absolute value of the current deviation increases again due to the occurrence of the overshoot caused by the rapid decrease in reverse voltage, in some cases. As a result, for example, if the adjustment of the control gain is cancelled based on only the condition that the absolute value of the current deviation is equal to or smaller than the second current deviation threshold, there is concern of repeat of increase and decrease in the value of the control gain. In this regard, with the steering control device according to the aspect of the present disclosure, the state where the control gain is large continues for the predetermined time. Therefore, it is possible to prevent the control gain from being frequently switched, and to restrain a steering feeling from being worsened.

With the steering control device according to the aspect of the present disclosure, it is possible to restrain the overshoot of the electric current that is supplied to the motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
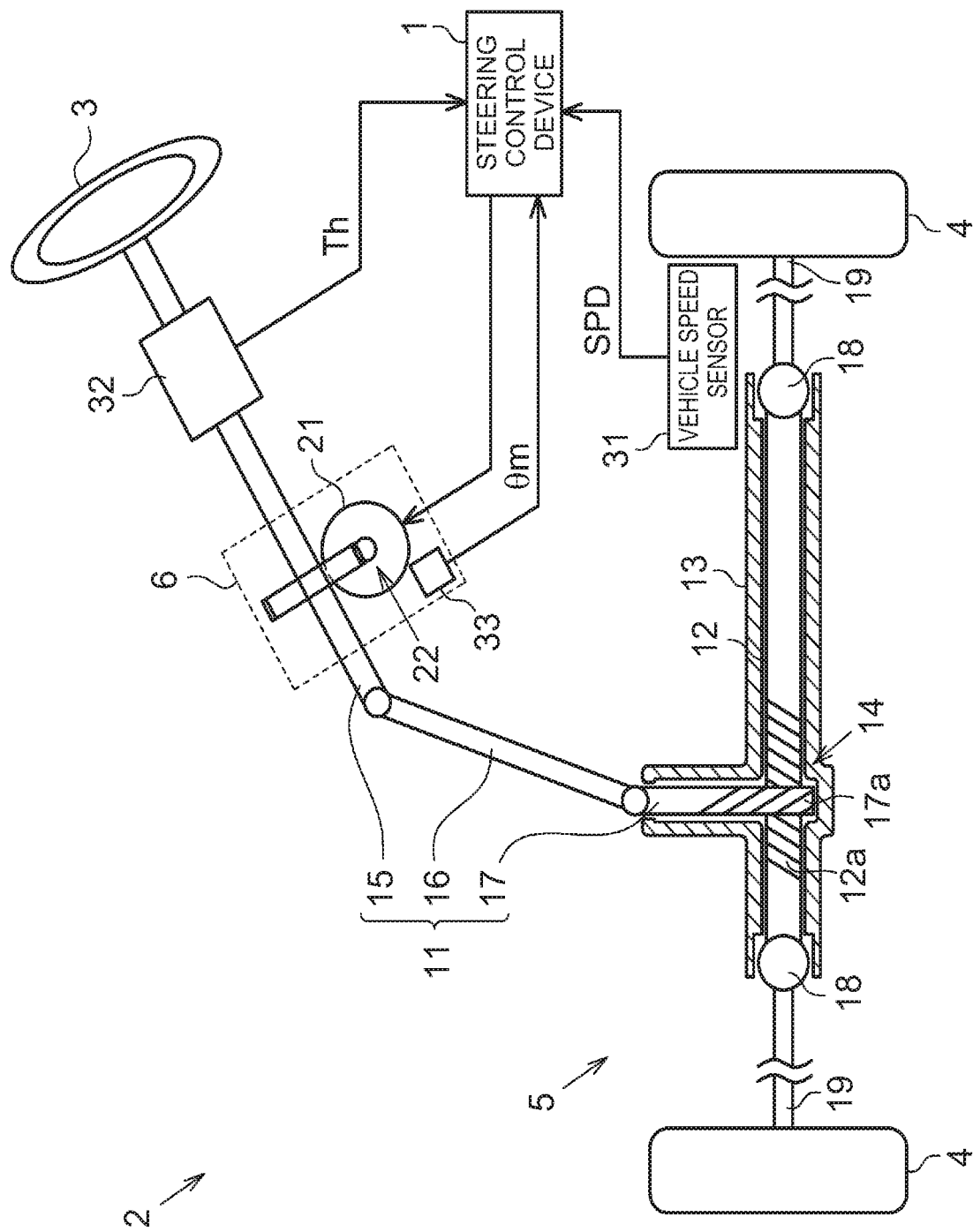
FIG. 1 is a schematic diagram of an electric power steering device.

An embodiment of a steering control device will be described below with reference to the drawings. As shown in FIG. 1, an electric power steering device (EPS) 2 as a steering device that is controlled by a steering control device 1 includes a steering mechanism 5 that turns turning wheels 4 based on operation of a steering wheel 3 by a driver. The EPS 2 includes an EPS actuator 6 as an actuator that gives assist force for assisting steering operation, to the steering mechanism 5.

The steering mechanism 5 includes a steering shaft 11 to which a steering wheel 3 is fixed, a rack shaft 12 as a turning shaft that is coupled to the steering shaft 11, a rack housing 13 as a housing into which a rack shaft 12 is inserted so as to be capable of reciprocating, and a rack-and-pinion mechanism 14 that transforms rotation of the steering shaft 11 into movement of the rack shaft 12. The steering shaft 11 is constructed by coupling a column shaft 15, an intermediate shaft 16 and a pinion shaft 17 in order from the position of the steering wheel 3.

The rack shaft 12 and the pinion shaft 17 are disposed at a predetermined crossing angle in the rack housing 13. The rack-and-pinion mechanism 14 is constructed by engaging rack teeth 12a formed on the rack shaft 12 and pinion teeth 17a formed on the pinion shaft 17. Tie rods 19 are rotatably coupled to both ends of the rack shaft 12 through rack ends 18 each of which is constituted by a ball joint provided at an end portion of the rack shaft 12. Distal ends of the tie rods 19 are coupled to unillustrated knuckles to which the turning wheels 4 are attached. Accordingly, in the EPS 2, the rotation of the steering shaft 11 due to the steering operation is transformed into the axial movement of the rack shaft 12 by the rack-and-pinion mechanism 14, and the axial movement is transmitted to the knuckles through the tie rods 19, so that the turning angle of the turning wheels 4, that is, the running direction of the vehicle is changed.

A position of the rack shaft 12 where the rack end 18 abuts on the left end of the rack housing 13 is a position that allows a maximum rightward steering, and this position corresponds to a rack end position that is an end position on the right side. Further, a position of the rack shaft 12 where the rack end 18 abuts on the right end of the rack housing 13 is a position that allows a maximum leftward steering, and this position corresponds to a rack end position that is an end position on the left side.

The EPS actuator 6 includes a motor 21 that is a drive source, and a speed reducer 22 such as a worm and wheel mechanism. The motor 21 is coupled to the column shaft 15 through the speed reducer 22. The EPS actuator 6 reduces the speed of the rotation of the motor 21 with the speed reducer 22, and then transmits the rotation of the motor 21 to the column shaft 15. Thereby, the EPS actuator 6 gives motor torque to the steering mechanism 5 as the assist force. As the motor 21 in the embodiment, a three-phase brushless motor is employed.

The steering control device 1 is connected to the motor 21, and controls action of the motor 21. The steering control device 1 includes an unillustrated central processing unit (CPU) and an unillustrated memory, and the CPU executes programs stored in the memory in a predetermined computation cycle. Thereby, various controls are executed.

The steering control device 1 is connected to a vehicle speed sensor 31 that detects a vehicle speed SPD of the vehicle, and a torque sensor 32 that detects a steering torque Th given to the steering shaft 11 due to the steering by the driver. The steering control device 1 is connected to a rotation sensor 33 that detects a rotation angle θm of the motor 21 as a relative angle in a range of 360°. For example, the steering torque Th and the rotation angle θm are detected as positive values in the case of rightward steering, and are detected as negative values in the case of leftward steering. The steering control device 1 supplies drive electric power to the motor 21 based on signals that are input from the sensors and that indicate state quantities, and thereby controls the action of the EPS actuator 6, that is, the assist force that is given to the steering mechanism 5 for reciprocating the rack shaft 12.

Figure 2:
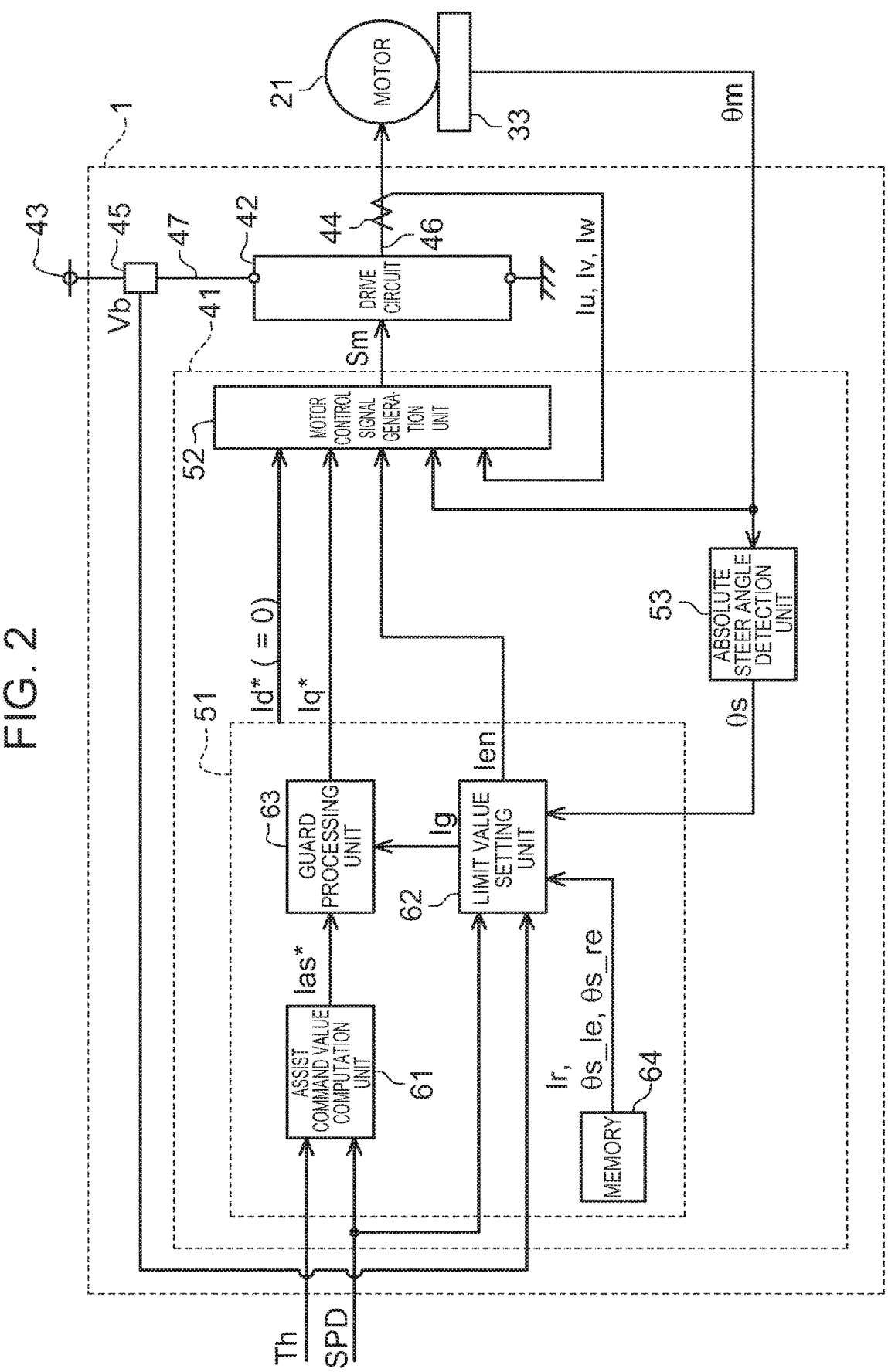
FIG. 2 is a block diagram of a steering control device.

Next, the configuration of the steering control device 1 will be descried. As shown in FIG. 2, the steering control device 1 includes a microcomputer 41 as a control circuit that outputs a motor control signal Sm, and a drive circuit 42 that supplies the drive electric power to the motor 21 based on the motor control signal Sm. As the drive circuit 42 in the embodiment, a well-known PWM inverter including a plurality of switching elements such as FETs is employed. The motor control signal Sm that is output by the microcomputer 41 specifies an on-state or off-state of each switching element. Thereby, in response to the motor control signal Sm, each switching element is turned on or off, and a pattern of energization to motor coils for the respective phases is switched, so that direct-current electric power of an in-vehicle electric source 43 is transformed into three-phase drive electric power and the three-phase drive electric power is output to the motor 21.

Control blocks described below are realized by computer programs that are executed by the microcomputer 41. The state quantities are detected in a predetermined sampling cycle, and computation processes indicated by the control blocks described below are executed in a predetermined computation cycle.

The microcomputer 41 receives the vehicle speed SPD, the steering torque Th, and the rotation angle θm of the motor 21. Further, the microcomputer 41 receives current values Iu, Iv, Iw in the respective phases of the motor 21, which are current values detected by current sensors 44, and a source voltage Vb of the in-vehicle electric source 43, which is a source voltage detected by a voltage sensor 45. The current sensors 44 are provided on connecting wires 46 between the drive circuit 42 and the motor coils for the respective phases. The voltage sensor 45 is provided on a connecting wire 47 between the in-vehicle electric source 43 and the drive circuit 42. In FIG. 2, for convenience of description, the current sensors 44 for the respective phases and the connecting wires 46 for the respective phases are illustrated as a single current sensor 44 and a single connecting wire 46, respectively. The microcomputer 41 outputs the motor control signal Sm based on the state quantities.

More specifically, the microcomputer 41 includes a current command value computation unit 51 that computes current command values Id*, Iq*, a motor control signal generation unit 52 that outputs the motor control signal Sm based on the current command values Id*, Iq*, and an absolute steer angle detection unit 53 that detects an absolute steer angle θs.

The current command value computation unit 51 receives the steering torque Th, the vehicle speed SPD and the absolute steer angle θs. The current command value computation unit 51 computes current command values Id*, Iq* based on the state quantities. The current command values Id*, Iq* are target values of electric currents that should be supplied to the motor 21, and respectively indicate a current command value on a d-axis and a current command value on a q-axis in a d/q coordinate system. The q-axis current command value Iq* indicates a target value of the motor torque that is output by the motor 21. In the embodiment, the d-axis current command value Id* is basically fixed at zero. For example, the current command values Id*, Iq* are positive values in the case of assist of the rightward steering, and are negative values in the case of assist of the leftward steering.

The motor control signal generation unit 52 receives the current command values Id*, Iq*, the current values Iu, Iv, Iw in the respective phases, the rotation angle θm of the motor 21, and a steer angle limit value Ien described later. The motor control signal generation unit 52 generates the motor control signal Sm by executing a current feedback control in the d/q coordinate system based on the state quantities, and outputs the motor control signal Sm to the drive circuit 42. Thereby, the drive electric power corresponding to the motor control signal Sm is supplied to the motor 21. Then, the motor torque corresponding to the q-axis current command value Iq* is output from the motor 21, and the assist force is given to the steering mechanism 5.

The absolute steer angle detection unit 53 receives the rotation angle θm. The absolute steer angle detection unit 53 detects a motor absolute angle that is expressed as an absolute angle having a range beyond 360°, based on the rotation angle θm. The absolute steer angle detection unit 53 in the embodiment sets, as a starting point, the rotation angle θm when a start switch such as an ignition switch is turned on for the first time, for example, after replacement of the in-vehicle electric source 43, adds up the rotation number of the motor 21, and detects the motor absolute angle based on the rotation number and the rotation angle θm. The absolute steer angle detection unit 53 detects the absolute steer angle θs indicating the steering angle of the steering shaft 11, by multiplying the motor absolute angle by a conversion factor based on the reduction ratio of the speed reducer 22. The steering control device 1 in the embodiment monitors whether the motor 21 rotates, even while the start switch is in the off-state, and adds up the rotation number of the motor 21 at all times. Therefore, even when the start switch is turned on for the second time after the replacement of the in-vehicle electric source 43, the starting point of the absolute steer angle θs is the same as the starting point set when the start switch is turned on for the first time.

As described above, the turning angle of the turning wheel 4 is changed by the rotation of the steering shaft 11, and therefore the absolute steer angle θs indicates a rotation angle of a rotation shaft that is capable of being converted into the turning angle of the turning wheel 4. For example, the motor absolute angle and the absolute steer angle θs are positive values in the case of a rightward rotation angle with respect to the starting point, and are negative values in the case of a leftward rotation angle with respect to the starting point.

Next, the configuration of the current command value computation unit 51 will be described in detail. The current command value computation unit 51 includes an assist command value computation unit 61 that computes an assist command value Ias* that is a basic component of the q-axis current command value Iq*. Further, the current command value computation unit 51 includes a limit value setting unit 62 that sets a limit value Ig that is an upper limit of the absolute value of the q-axis current command value Iq*, and a guard processing unit 63 that limits the absolute value of the assist command value Ias* to a value that is equal to or smaller than the limit value Ig. The limit value setting unit 62 is connected to a memory 64.

The assist command value computation unit 61 receives the steering torque Th and the vehicle speed SPD. The assist command value computation unit 61 computes the assist command value Ias* based on the steering torque Th and the vehicle speed SPD. Specifically, the assist command value computation unit 61 computes the assist command value Ias* having a larger absolute value as the absolute value of the steering torque Th increases and the vehicle speed SPD decreases. The assist command value Ias* computed in this way is output to the guard processing unit 63.

In addition to the assist command value Ias*, the guard processing unit 63 receives the limit value Ig that is set in the limit value setting unit 62 as described later. When the absolute value of the input assist command value Ias* is equal to or smaller than the limit value Ig, the guard processing unit 63 outputs, as the q-axis current command value Iq*, the value of the assist command value Ias* with no change, to the motor control signal generation unit 52. On the other hand, when the absolute value of the input assist command value Ias* is larger than the limit value Ig, the guard processing unit 63 outputs, as the q-axis current command value Iq*, a value resulting from limiting the absolute value of the assist command value Ias* to the limit value Ig, to the motor control signal generation unit 52.

In the memory 64, a rated current Ir corresponding to a rated torque previously set as the motor torque that can be output by the motor 21, end position correspondence angles θs_le, θs_re, and the like are stored. The end position correspondence angle θs_le on the left side is the absolute steer angle θs corresponding to the rack end position on the left side, and the end position correspondence angle θs_re on the right side is the absolute steer angle θs corresponding to the rack end position on the right side. The end position correspondence angle θs_le, θs_re are set, for example, by a learning that is appropriately performed based on the steering by the driver.

Next, the configuration of the limit value setting unit 62 will be described. The limit value setting unit 62 receives the absolute steer angle θs, the vehicle speed SPD, the source voltage Vb, the rated current Ir, and the end position correspondence angles θs_le, θs_re. The limit value setting unit 62 sets the limit value Ig based on the state quantities.

Figure 3:
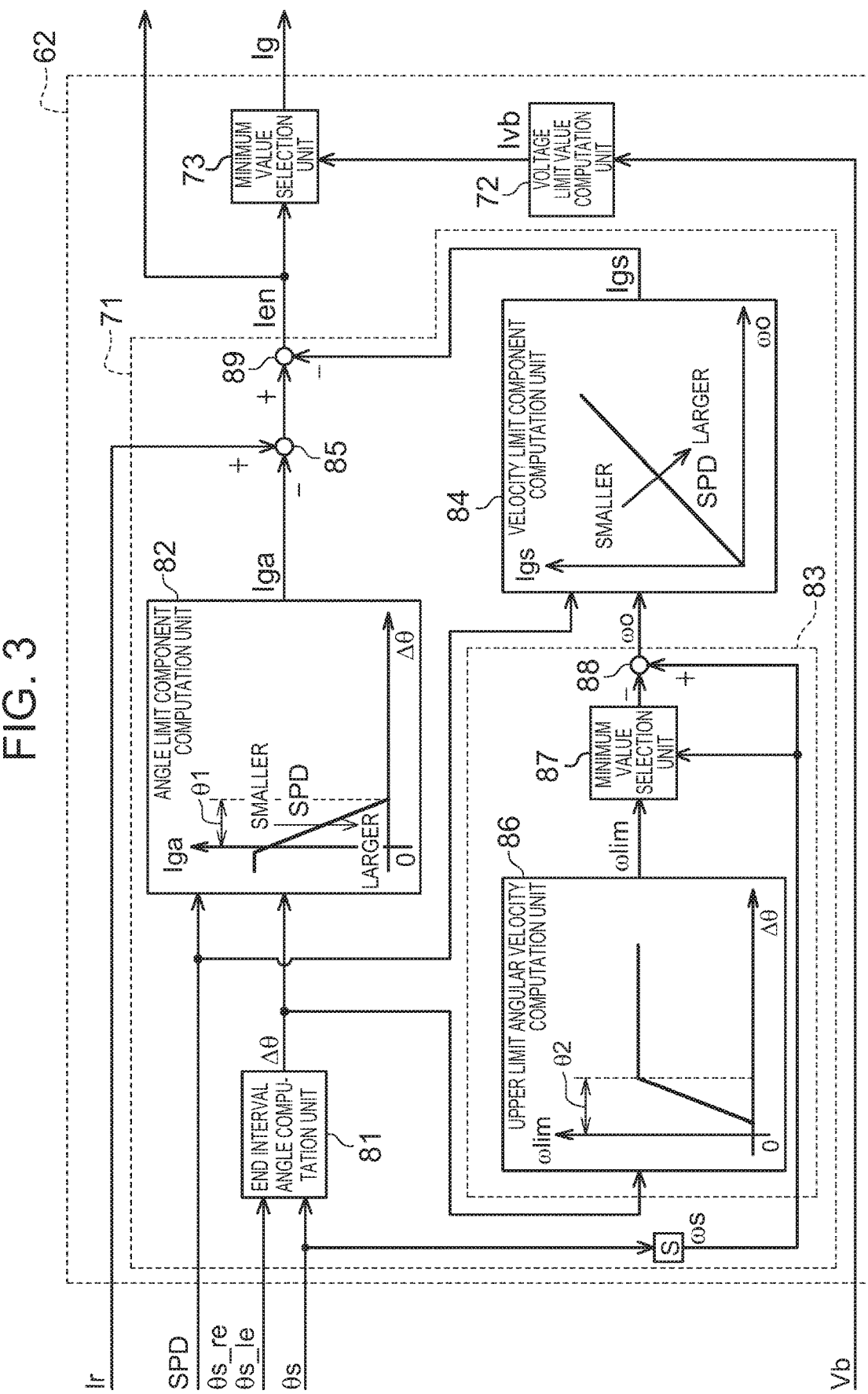
FIG. 3 is a block diagram of a limit value setting unit.

More specifically, as shown in FIG. 3, the limit value setting unit 62 includes a steer angle limit value computation unit 71 that computes the steer angle limit value Ien based on the absolute steer angle θs, a voltage limit value computation unit 72 that computes a voltage limit value Ivb as another limit value based on the source voltage Vb, and a minimum value selection unit 73 that selects the smaller one of the steer angle limit value Ien and the voltage limit value Ivb.

The steer angle limit value computation unit 71 receives the absolute steer angle θs, the vehicle speed SPD, the rated current Ir, and the end position correspondence angles θs_le, θs_re. When an end interval angle Δθ indicating the distance of the absolute steer angle θs from the end position correspondence angle θs_le, θs_re is equal to or smaller than a predetermined angle θ1 as described later, based on the state quantities, the steer angle limit value computation unit 71 computes the steer angle limit value Ien that decreases based on decrease in the end interval angle Δθ. The steer angle limit value Ien computed in this way is output to the minimum value selection unit 73.

The voltage limit value computation unit 72 receives the source voltage Vb. When the absolute value of the source voltage Vb is equal to or smaller than a preset voltage threshold Vth, the voltage limit value computation unit 72 computes the voltage limit value Ivb that is smaller than a rated voltage for supplying the rated current Ir. Specifically, when the absolute value of the source voltage Vb is equal to or smaller than the voltage threshold Vth, the voltage limit value computation unit 72 computes the voltage limit value Ivb having a smaller absolute value based on the decrease in the absolute value of the source voltage Vb. The voltage limit value Ivb computed in this way is output to the minimum value selection unit 73.

The minimum value selection unit 73 selects, as the limit value Ig, the smaller one of the steer angle limit value Ien and voltage limit value Ivb that are input, and outputs the smaller one to the guard processing unit 63. In the case where the steer angle limit value Ien is output to the guard processing unit 63 as the limit value Ig, the absolute value of the q-axis current command value Iq* is limited to the steer angle limit value Ien. Thereby, when the end interval angle $\Delta\theta$ is equal to or smaller than the predetermined angle $\theta 1$, the absolute value of the q-axis current command value Iq* decreases based on the decrease in the end interval angle $\Delta\theta$, so that an end-abutting relaxation control is executed. The end-abutting relaxation control relaxes impact of end abutting in which the rack end 18 collides with the rack housing 13.

In the case where the voltage limit value Ivb is output to the guard processing unit 63 as the limit value Ig, the absolute value of the q-axis current command value Iq* is limited to the voltage limit value Ivb. Thereby, when the absolute value of the source voltage Vb is equal to or smaller than the voltage threshold Vth, a source protection control is executed. By the source protection control, the absolute voltage of the q-axis current command value Iq* decreases based on the decrease in the absolute value of the source voltage Vb.

Next, the configuration of the steer angle limit value computation unit 71 will be described. The steer angle limit value computation unit 71 includes an end interval angle computation unit 81 that computes the end interval angle $\Delta\theta$, and an angle limit component computation unit 82 that computes an angle limit component Iga that is a current limit amount decided depending on the end interval angle $\Delta\theta$. Further, the steer angle limit value computation unit 71 includes an excess angular velocity computation unit 83 that computes an excess angular velocity $\omega o$ that is an excess of a steering velocity $\omega s$ relative to an upper limit angular velocity $\omega lim$, and a velocity limit component computation unit 84 that computes a velocity limit component Igs that is a current limit amount decided depending on the excess angular velocity $\omega o$.

The end interval angle computation unit 81 receives the absolute steer angle $\theta s$ and the end position correspondence angles $\theta s\_le$, $\theta s\_re$. The end interval angle computation unit 81 computes the difference between the absolute steer angle $\theta s$ in the last computation cycle and the end position correspondence angle $\theta s\_le$ on the left side and the difference between the absolute steer angle $\theta s$ in the last computation cycle and the end position correspondence angle $\theta s\_re$ on the right side. Then, the end interval angle computation unit 81 outputs the absolute value of the smaller one of the computed differences to the angle limit component computation unit 82 and the excess angular velocity computation unit 83, as the end interval angle $\Delta\theta$.

The angle limit component computation unit 82 receives the end interval angle $\Delta\theta$ and the vehicle speed SPD. The angle limit component computation unit 82 includes a map deciding a relation of the end interval angle $\Delta\theta$, the vehicle speed SPD and the angle limit component Iga, and computes the angle limit component Iga corresponding to the end interval angle $\Delta\theta$ and the vehicle speed SPD, by referring to the map.

In the map, the angle limit component Iga is set so as to decrease in proportion to increase in the end interval angle $\Delta\theta$ from zero and to become zero when the end interval angle $\Delta\theta$ becomes larger than the predetermined angle $\theta 1$. In the map, a region where the end interval angle $\Delta\theta$ is negative is also set. The angle limit component Iga increases in proportion to the decrease in the end interval angle $\Delta\theta$ when the end interval angle $\Delta\theta$ is smaller than zero, and is constant after the angle limit component Iga becomes the same magnitude as the rated current Ir. In the negative region of the map, the rotation of the motor 21 due to elastic deformation of the EPS 2 by further performing steering in the same direction in the state where the rack end 18 abuts on the rack housing 13 is considered. The predetermined angle $\theta 1$ is set to a small angle indicating ranges of vicinities of the end position correspondence angles $\theta s\_le$, $\theta s\_re$. That is, the angle limit component Iga is set so as to be smaller as the absolute steer angle $\theta s$ is closer to a steering neutral side with respect to the end position correspondence angles $\theta s\_le$, $\theta s\_re$, and to be zero when the absolute steer angle $\theta s$ is on the steering neutral position side beyond the vicinities of the end position correspondence angles $\theta s\_le$, $\theta s\_re$.

Further, in the map, the angle limit component Iga is set so as to decrease based on increase in the vehicle speed SPD, in a region in which the end interval angle $\Delta\theta$ is equal to or smaller than the predetermined angle $\theta 1$. Specifically, in a region in which the vehicle speed SPD is low, the angle limit component Iga is set so as to be larger than zero, and in a region in which the vehicle speed SPD is middle or high, the angle limit component Iga is set so as to be zero. The angle limit component Iga computed in this way is output to a subtracter 85.

The excess angular velocity computation unit 83 receives the end interval angle $\Delta\theta$ and the steering velocity $\omega s$. The steering velocity $\omega s$ is obtained by differentiating the absolute steer angle $\theta s$. The excess angular velocity computation unit 83 computes the excess angular velocity $\omega o$ based on the state quantities.

More specifically, the excess angular velocity computation unit 83 includes an upper limit angular velocity computation unit 86 that computes the upper limit angular velocity $\omega lim$. The upper limit angular velocity computation unit 86 receives the end interval angle $\Delta\theta$. The upper limit angular velocity computation unit 86 includes a map deciding a relation of the end interval angle $\Delta\theta$ and the upper limit angular velocity $\omega lim$, and computes the upper limit angular velocity $\omega lim$ corresponding to the end interval angle $\Delta\theta$, by referring to the map.

In the map, the upper limit angular velocity $\omega lim$ is set such that the upper limit angular velocity $\omega lim$ is lowest when the end interval angle $\Delta\theta$ is zero and the upper limit angular velocity $\omega lim$ increases in proportion to increase in the end interval angle $\Delta\theta$. Further, the upper limit angular velocity $\omega lim$ is set so as to be kept at a value that is previously set as the maximum angular velocity at which the motor 21 can rotate, when the end interval angle $\Delta\theta$ is larger than a predetermined angle $\theta 2$. The predetermined angle $\theta 2$ is set to an angle that is larger than the above predetermined angle $\theta 1$.

When the absolute value of the steering velocity $\omega s$ is higher than the upper limit angular velocity $\omega lim$ corresponding to the end interval angle $\Delta\theta$, the excess angular velocity computation unit 83 outputs the excess of the steering velocity $\omega s$ relative to the upper limit angular velocity $\omega lim$, to the velocity limit component computation unit 84, as the excess angular velocity $\omega o$. On the other hand, when the absolute value of the steering velocity $\omega s$ is equal to or lower than the upper limit angular velocity $\omega lim$, the excess angular velocity computation unit 83 outputs the excess angular velocity $\omega o$ indicating zero, to the velocity limit component computation unit 84.

Specifically, the excess angular velocity computation unit 83 includes a minimum value selection unit 87 that receives the upper limit angular velocity ωlim and the steering velocity ωs. The minimum value selection unit 87 selects the smaller one of the upper limit angular velocity ωlim and the absolute value of the steering velocity ωs, and outputs the smaller one to a subtracter 88. Then, with the subtracter 88, the excess angular velocity computation unit 83 computes the excess angular velocity ωo by subtracting the output value of the minimum value selection unit 87 from the absolute value of the steering velocity ωs. In the case where the absolute value of the steering velocity ωs is equal to or smaller than the upper limit angular velocity ωlim in the selection of the smaller one of the upper limit angular velocity ωlim and the absolute value of the steering velocity ωs by the minimum value selection unit 87, the steering velocity ωs is subtracted from the steering velocity ωs by the subtracter 88, so that the excess angular velocity ωo becomes zero. On the other hand, in the case where the absolute value of the steering velocity ωs is larger than the upper limit angular velocity ωlim, the upper limit angular velocity ωlim is subtracted from the absolute value of the steering velocity ωs by the subtracter 88, so that the excess of the steering velocity ωs relative to the upper limit angular velocity ωlim is the excess angular velocity ωo.

The velocity limit component computation unit 84 receives the excess angular velocity ωo and the vehicle speed SPD. The velocity limit component computation unit 84 includes a map deciding a relation of the excess angular velocity ωo, the vehicle speed SPD and the velocity limit component Igs, and computes the velocity limit component Igs corresponding to the excess angular velocity ωo and the vehicle speed SPD, by referring to the map.

In the map, the velocity limit component Igs is set such that the velocity limit component Igs is smallest when the excess angular velocity ωo is zero and the velocity limit component Igs increases in proportion to increase in the excess angular velocity ωo. Further, in the map, the velocity limit component Igs is set so as to decrease based on increase in the vehicle speed SPD. In the map, the absolute value of the velocity limit component Igs is set so as to be smaller than the absolute value of the angle limit component Iga. The velocity limit component Igs computed in this way is output to a subtracter 89.

The rated current Ir is input to the subtracter 85 that receives the angle limit component Iga. The steer angle limit value computation unit 71 outputs a value resulting from subtracting the angle limit component Iga from the rated current Ir with the subtracter 85, to the subtracter 89 that receives the velocity limit component Igs. Then, the steer angle limit value computation unit 71 outputs a value resulting from subtracting the velocity limit component Igs from the output value of the subtracter 85 with the subtracter 89, that is, a value resulting from subtracting the angle limit component Iga and the velocity limit component Igs from the rated current Ir, to the minimum value selection unit 73, as the steer angle limit value Ien. The steer angle limit value Ien is output also to the motor control signal generation unit 52.

Figure 4:
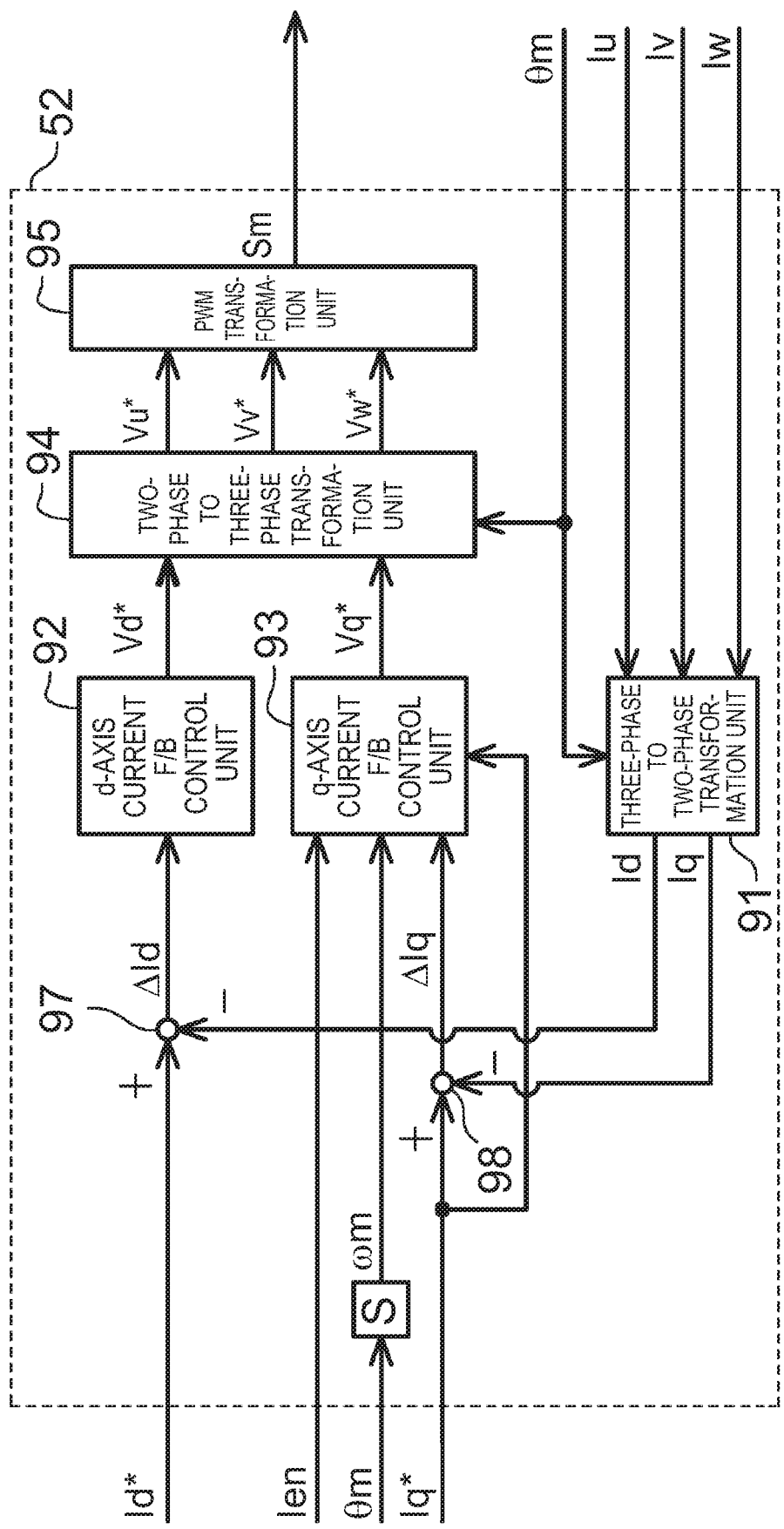
FIG. 4 is a block diagram of a motor control signal generation unit.

Next, the motor control signal generation unit 52 will be described. As shown in FIG. 4, the motor control signal generation unit 52 computes the motor control signal Sm by executing a current feedback computation in the d/q coordinate system based on the current command values Id*, Iq*. Hereinafter, the word "feedback" is also written as "F/B".

More specifically, the motor control signal generation unit 52 includes a three-phase to two-phase transformation unit 91 that computes a d-axis actual current value Id and a q-axis actual current value Iq. Further, the motor control signal generation unit 52 includes a d-axis current F/B control unit 92 that computes a d-axis voltage command value Vd* by the execution of the current F/B computation, and a q-axis current F/B control unit 93 that computes a q-axis voltage command value Vq* by the execution of the current F/B computation. Further, the motor control signal generation unit 52 includes a two-phase to three-phase transformation unit 94 that computes voltage command values Vu*, Vv*, Vw* in the three phases, and a PWM transformation unit 95 that generates the motor control signal Sm.

The three-phase to two-phase transformation unit 91 receives the current values Iu, Iv, Iw in the respective phases and the rotation angle θm. The three-phase to two-phase transformation unit 91 computes the d-axis actual current value Id and the q-axis actual current value Iq, by mapping the current values Iu, Iv, Iw in the respective phases on the d/q coordinate system based on the rotation angle θm. The d-axis actual current value Id is input to a subtracter 97 together with the d-axis current command value Id*, and the q-axis actual current value Iq is input to a subtracter 98 together with the q-axis current command value Iq*. The subtracter 97 computes a d-axis current deviation ΔId by subtracting the d-axis actual current value Id from the d-axis current command value Id*, and outputs the d-axis current deviation ΔId to the d-axis current F/B control unit 92. The subtracter 98 computes a q-axis current deviation ΔIq by subtracting the q-axis actual current value Iq from the q-axis current command value Iq*, and outputs the q-axis current deviation ΔIq to the q-axis current F/B control unit 93.

The d-axis current F/B control unit 92 performs a current F/B computation by which the d-axis actual current value Id follows the d-axis current command value Id*, based on the d-axis current deviation ΔId, and computes the d-axis voltage command value Vd*. Specifically, the d-axis current F/B control unit 92 computes the d-axis voltage command value Vd*, by adding a proportional component obtained by multiplying the d-axis current deviation ΔId by a proportional gain Kdp and an integral component obtained by multiplying the integrated value of the d-axis current deviation ΔId by an integral gain Kdi.

The q-axis current F/B control unit 93 receives, in addition to the q-axis current deviation ΔIq, the q-axis current command value Iq*, the steer angle limit value Ien, and a motor angular velocity ωm obtained by differentiating the rotation angle θm. Based on the state quantities, the q-axis current F/B control unit 93 performs a current F/B computation by which the q-axis actual current value Iq follows the q-axis current command value Iq*, and computes the q-axis voltage command value Vq*. Specifically, the q-axis current F/B control unit 93 computes the q-axis voltage command value Vq*, by adding a proportional component obtained by multiplying the q-axis current deviation ΔIq by a proportional gain Kqp and an integral component obtained by multiplying the integrated value of the q-axis current deviation ΔIq by an integral gain Kqi. As described later, the proportional gain Kqp and the integral gain Kqi are changed depending on state quantities that are input. The d-axis voltage command value Vd* and q-axis voltage command value Vq* computed in this way are output to the two-phase to three-phase transformation unit 94.

The two-phase to three-phase transformation unit 94 receives the rotation angle θm, in addition to the d-axis voltage command value Vd* and the q-axis voltage command value Vq*. The two-phase to three-phase transformation unit 94 computes the voltage command values Vu*, Vv*, Vw* in the three phases, by mapping the d-axis voltage command value Vd* and the q-axis voltage command value Vq* on three-phase alternating-current coordinates based on the rotation angle θm. The voltage command values Vu*, Vv*, Vw* computed in this way are output to the PWM transformation unit 95.

The PWM transformation unit 95 computes a duty command value based on the voltage command values Vu*, Vv*, Vw*, and generates the motor control signal Sm having a duty ratio indicated by the duty command value, through comparison between the duty command value and a PWM carrier as a carrier wave such as a triangular wave and a saw-tooth wave.

Next, adjustment of the proportional gain Kqp and the integral gain Kqi by the q-axis current F/B control unit 93 will be described. When overshoot of the q-axis actual current value Iq occurs during the execution of the end-abutting relaxation control, the q-axis current F/B control unit 93 in the embodiment adjusts the proportional gain Kqp and the integral gain Kqi as control gains to be used in the current F/B computation, such that the proportional gain Kqp and the integral gain Kqi increase. The proportional gain Kqp and the integral gain Kqi are previously set to optimum values based on results of experiments or the like. As the adjustment of the proportional gain Kqp and the integral gain Kqi, for example, a method of performing multiplication by a preset constant number, or a method of performing addition of a predetermined value is employed.

More specifically, the q-axis current F/B control unit 93 adjusts the proportional gain Kqp and the integral gain Kqi such that the proportional gain Kqp and the integral gain Kqi increase, when an adjustment start condition constituted by (a) to (c) described below is satisfied during the execution of the end-abutting relaxation control by which the absolute value of the q-axis current command value Iq* is limited to the steer angle limit value Ien. When the absolute value of the input q-axis current command value Iq* is equal to the steer angle limit value Ien, the q-axis current F/B control unit 93 determines that the absolute value of the q-axis current command value Iq* is limited to the steer angle limit value Ien and the end-abutting relaxation control is being executed.

(a) The absolute value of the q-axis current deviation ΔIq is equal to or larger than a preset first current deviation threshold ΔIth1.

(b) The absolute value of the motor angular velocity ωm is equal to or larger than a preset angular velocity threshold ωth.

(c) The absolute value of an angular velocity change amount Δω that is a change amount of the motor angular velocity ωm is equal to or larger than a preset angular velocity change amount threshold Δωth. The first current deviation threshold ΔIth1 is a value indicating a current deviation that can cause a steering feeling to be worsened, for example, and is previously set. The angular velocity threshold ωth is a value indicating a relatively high angular velocity at which the end abutting occurs, for example, and is previously set. The angular velocity change amount threshold Δωth is an angular velocity change amount indicating decrease in the motor angular velocity ωm due to the execution of the end-abutting relaxation control, for example, and is previously set. As the angular velocity change amount Δω in the embodiment, the difference between the motor angular velocity ωm acquired in the last computation cycle by the q-axis current F/B control unit 93 and the motor angular velocity ωm acquired in the second to the last computation cycle by the q-axis current F/B control unit 93 is used.

The q-axis current F/B control unit 93 cancels the adjustment of the proportional gain Kqp and the integral gain Kqi and sets the original values, when a cancellation condition constituted by (d) and (e) described below is satisfied after the adjustment of the proportional gain Kqp and the integral gain Kqi.

(d) The absolute value of the q-axis current deviation ΔIq is equal to or smaller than a preset second current deviation threshold ΔIth2 that is smaller than the first current deviation threshold ΔIth1.

(e) The state where the proportional gain Kqp and the integral gain Kqi have been adjusted so as to increase continues for a predetermined time.

The second current deviation threshold ΔIth2 is a value indicating a current deviation that is unlikely to cause the steering feeling to be worsened, for example, and is previously set. The predetermined time is a time in which the overshoot of the q-axis actual current value is likely to occur during the execution of the end-abutting relaxation control, and is previously set.

Figure 5:
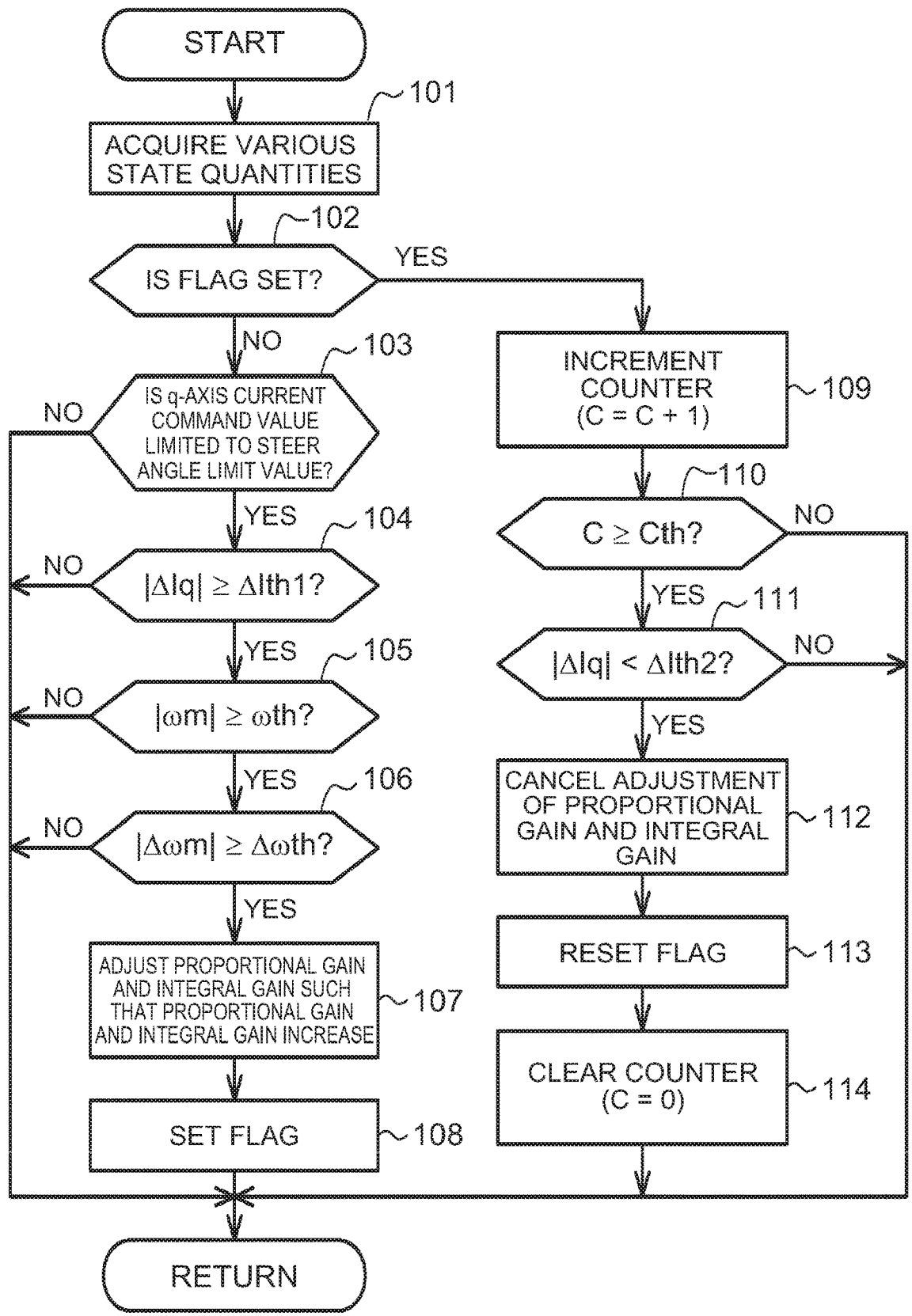
FIG. 5 is a flowchart showing a processing procedure for adjustment of a proportional gain and an integral gain by a q-axis current F/B control unit.

Specifically, as shown in a flowchart of FIG. 5, the q-axis current F/B control unit 93 acquires various state quantities (step 101), and then determines whether a flag indicating that the proportional gain Kqp and the integral gain Kqi have been adjusted so as to increase is set (step 102). In the case where the flag is not set (step 102: NO), the q-axis current F/B control unit 93 determines whether the end-abutting relaxation control is being executed by the limitation of the q-axis current command value Iq* to the steer angle limit value Ien (step 103).

Subsequently, in the case where the absolute value of the q-axis current command value Iq* is limited to the steer angle limit value Ien (step 103: YES), the q-axis current F/B control unit 93 determines whether the absolute value of the q-axis current deviation ΔIq is equal to or larger than the first current deviation threshold ΔIth1 (step 104). In the case where the absolute value of the q-axis current deviation ΔIq is equal to or larger than the first current deviation threshold ΔIth1 (step 104: YES), the q-axis current F/B control unit 93 determines whether the absolute value of the motor angular velocity ωm is equal to or larger than the angular velocity threshold ωth (step 105). In the case where the absolute value of the motor angular velocity ωm is equal to or larger than the angular velocity threshold ωth (step 105: YES), the q-axis current F/B control unit 93 determines whether the absolute value of the angular velocity change amount Δω is equal to or larger than the angular velocity change amount threshold Δωth (step 106). In the case where the absolute value of the angular velocity change amount Δω is equal to or larger than the angular velocity change amount threshold Δωth (step 106: YES), the q-axis current F/B control unit 93 adjusts the proportional gain Kqp and the integral gain Kqi such that the proportional gain Kqp and the integral gain Kqi increase (step 107), and sets the flag (step 108).

On the other hand, in the case where the absolute value of the q-axis current command value Iq* is not limited to the steer angle limit value Ien (step 103: NO), that is, in the case where the end-abutting relaxation control is not being executed, in the case where the limit value Ig is set to the voltage limit value Ivb that is lower than the steer angle limit value Ien, or in other cases, the q-axis current F/B control unit 93 does not execute processes after that. Further, in the case where the absolute value of the q-axis current deviation ΔIq is smaller than the first current deviation threshold ΔIth1

(step 104: NO), in the case where the absolute value of the motor angular velocity ωm is smaller than the angular velocity threshold ωth (step 105: NO), or in the case where the absolute value of the angular velocity change amount Δω is smaller than the angular velocity change amount threshold Δωth (step 106: NO), the q-axis current F/B control unit 93 does not execute processes after that.

In the case where the flag is set (step 102: YES), the q-axis current F/B control unit 93 increments a count value C indicating the time elapsed after the proportional gain Kqp and the integral gain Kqi are adjusted (step 109). Subsequently, the q-axis current F/B control unit 93 determines whether the count value C is equal to or larger than a predetermined count value Cth corresponding to the predetermined time (step 110). In the case where the count value C is equal to or large than the predetermined count value Cth (step 110: YES), the q-axis current F/B control unit 93 determines whether the absolute value of the q-axis current deviation ΔIq is smaller than the second current deviation threshold ΔIth2 (step 111). In the case where the absolute value of the q-axis current deviation ΔIq is smaller than the second current deviation threshold ΔIth2 (step 111: YES), the q-axis current F/B control unit 93 cancels the adjustment of the proportional gain Kqp and the integral gain Kqi (step 112), resets the flag (step 113), and clears the count value C (step 114).

In the case where the count value C is smaller than the predetermined count value Cth (step 110: NO), or in the case where the absolute value of the q-axis current deviation ΔIq is equal to or larger than the second current deviation threshold ΔIth2 (step 111: NO), the q-axis current F/B control unit 93 does not execute processes after that.

Figure 6:
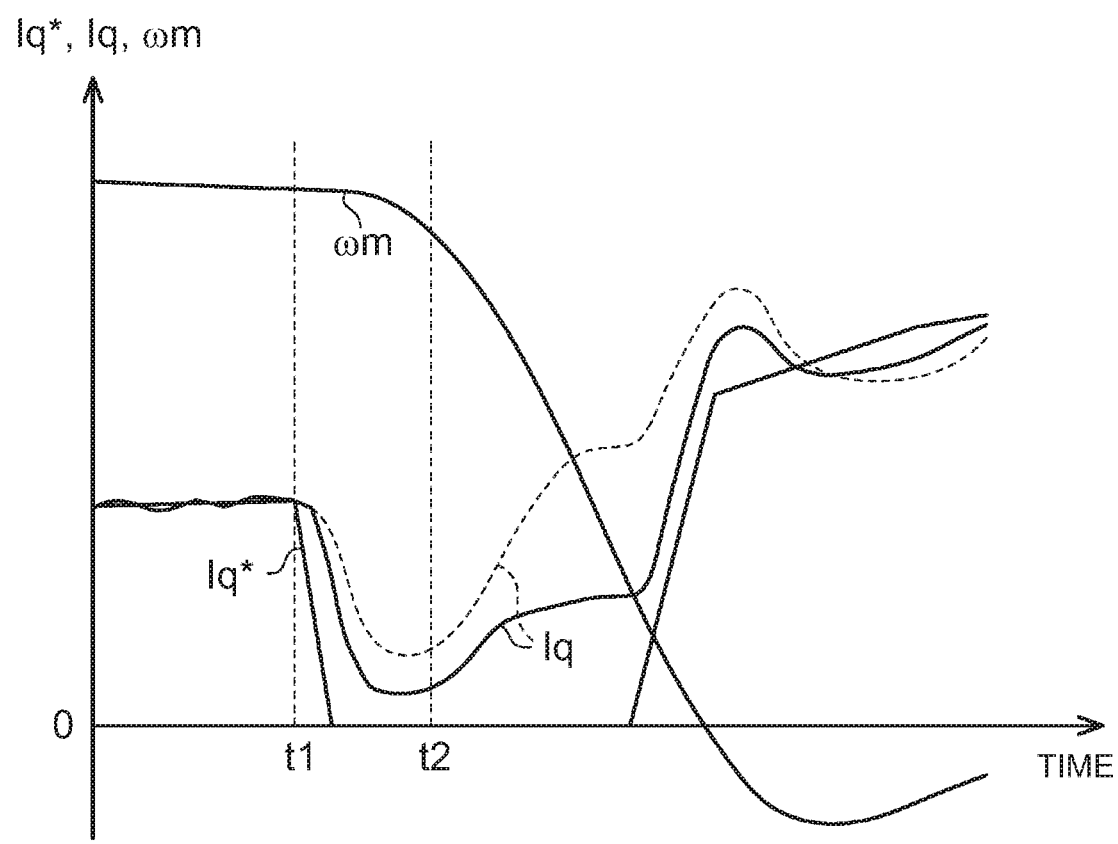
FIG. 6 is a graph showing an example of change in a q-axis current command value, a q-axis actual current value and a motor angular velocity before and after end abutting occurs.

Next, the change in the q-axis actual current value Iq due to the adjustment of the proportional gain Kqp and the integral gain Kqi will be described. Here, it is assumed that the driver performs the steering at high speed and the rack end 18 collides with the rack housing 13, with reference to FIG. 6. As shown in FIG. 6, the end interval angle Δθ becomes equal to or smaller than the predetermined angle θ1 at time t1, and then the q-axis current command value Iq*, which was a value corresponding to the steering torque Th and the vehicle speed SPD before that, decreases rapidly to zero. On this occasion, as shown by a broken line in FIG. 6, the q-axis actual current value Iq in a comparative example in which the proportional gain Kqp and the integral gain Kqi are not adjusted decreases so as to be delayed behind the q-axis current command value Iq*. Thereby, the q-axis actual current value Iq in the comparative example temporarily overshoots, and the gap between the q-axis current command value Iq* and the q-axis actual current value Iq increases. Thereafter, the overshoot of the q-axis actual current value Iq is reduced, but when the end abutting occurs at time t2, the reverse voltage decrease rapidly, so that the overshoot occurs again.

Specifically, after time t2, the motor 21 rotating at high speed stops suddenly, and the motor angular velocity ωm decreases, so that the reverse voltage generated in the motor 21 decreases rapidly. On the other hand, as described above, the q-axis current F/B control unit 93 performs the current F/B computation, and therefore the q-axis voltage command value Vq* output by the q-axis current F/B control unit 93 includes voltage for supplying electric current against the reverse voltage generated in the motor 21. However, the decrease in the reverse voltage is earlier than the decrease in the q-axis voltage command value Vq* due to the limitation of the q-axis current command value Iq*, and therefore voltage is temporarily applied to the motor 21, so that the overshoot of the q-axis actual current value Iq occurs.

Here, it is assumed that the absolute value of the q-axis current deviation ΔIq is equal to or larger than the first current deviation threshold ΔIth1 and the absolute value of the motor angular velocity ωm is equal to or larger than the angular velocity threshold ωth at time t1, and that the motor angular velocity ωm decreases by the limitation of the q-axis current command value Iq* and the absolute value of the angular velocity change amount Δω is equal to or larger than the angular velocity change amount threshold Δωth. As a result, in the embodiment, the responsiveness of the q-axis actual current value Iq becomes high because the proportional gain Kqp and the integral gain Fqi are adjusted so as to increase.

Thereby, as shown by a solid line in FIG. 6, the overshoot caused by the responsiveness of the q-axis actual current value Iq is restrained. Further, since the q-axis current F/B control unit 93 continues the state where the proportional gain Kqp and the integral gain Kqi are large, for the predetermined time, increase or decrease in the values of the proportional gain Kqp and the integral gain Kqi is avoided, and the overshoot caused by the rapid decrease in the reverse voltage is restrained.

In some cases, for example, the absolute value of the q-axis current deviation ΔIq is smaller than the first current deviation threshold ΔIth1 at time t1, and the proportional gain Kqp and the integral gain Kqi are not adjusted so as to increase at this time point. Even in the cases, at and after time t2, since the overshoot caused by the rapid decrease in the reverse voltage occurs, the absolute value of the q-axis current deviation ΔIq becomes equal to or larger than the first current deviation threshold ΔIth1, and the proportional gain Kqp and the integral gain Kqi are adjusted so as to increase. Thereby, the overshoot caused by the rapid decrease in the reverse voltage is restrained.

Next, the operation and effect of the embodiment will be described. When the overshoot of the q-axis actual current value Iq occurs during the execution of the end-abutting relaxation control, the q-axis current F/B control unit 93 adjusts the proportional gain Kqp and integral gain Kqi to be used in the current F/B computation, such that the proportional gain Kqp and the integral gain Kqi increase. Thereby, the responsiveness of the q-axis actual current value Iq to the q-axis current command value Iq* becomes high, and therefore it is possible to restrain the overshoot of the electric current that is supplied to the motor 21.

The current command value computation unit 51 executes the end-abutting relaxation control in a manner in which the absolute value of the q-axis current command value Iq* is limited to the steer angle limit value Ien. Accordingly, even when the current command value computation unit 51 limits the q-axis current command value Iq* to a maximum extent, the absolute value of the q-axis current command value Iq* is only zero at most. Therefore, the effect of the restraint of the overshoot through the adjustment of the proportional gain Kqp and the integral gain Kqi is high.

In the case of the satisfaction of the adjustment start condition including the condition that the absolute value of the q-axis current deviation ΔIq is equal to or larger than the first current deviation threshold ΔIth1, the q-axis current F/B control unit 93 determines that the overshoot of the q-axis actual current value Iq occurs, and adjusts the proportional gain Kqp and the integral gain Kqi such that the proportional gain Kqp and the integral gain Kqi increase. It is possible to exactly determine the occurrence of the overshoot, by performing comparison in magnitude between the absolute value of the q-axis current deviation ΔIq and the first current deviation threshold ΔIth1 in this way.

The adjustment start condition includes the condition that the absolute value of the motor angular velocity ωm is equal to or larger than the angular velocity threshold ωth, in addition to the condition that the absolute value of the q-axis current deviation ΔIq is equal to or larger than the first current deviation threshold ΔIth1. Therefore, it is possible to exactly perceive the case where the q-axis actual current value Iq overshoots due to the occurrence of the end abutting, and to increase the control gain, and it is possible to suitably restrain the overshoot.

The adjustment start condition includes the condition that the absolute value of the angular velocity change amount Δω is equal to or larger than the angular velocity change amount threshold Δωth, in addition to the condition that the absolute value of the q-axis current deviation ΔIq is equal to or larger than the first current deviation threshold ΔIth1. Therefore, it is possible to exactly perceive the case where the q-axis actual current value Iq overshoots due to the occurrence of the end abutting, and to increase the control gain, and it is possible to suitably restrain the overshoot.

When the proportional gain Kqp and the integral gain Kqi increase and thereby the responsiveness of the q-axis actual current value Iq becomes high, the motor 21 sensitively reacts, for example, to a slight change in the q-axis current command value Iq*, so that vibration or abnormal noise can be generated. In this regard, in the embodiment, when the cancellation condition is satisfied, the q-axis current F/B control unit 93 cancels the adjustment of the proportional gain Kqp and the integral gain Kqi. Therefore, it is possible to restrain the proportional gain Kqp and the integral gain Kqi from being kept large, when a high responsiveness is unnecessary due to reduction in the overshoot of the q-axis actual current value Iq, and it is possible to restrain the generation of vibration or abnormal noise.

The cancellation condition includes the condition that the absolute value of the q-axis current deviation ΔIq is equal to or smaller than the second current deviation threshold ΔIth2, and therefore it is possible to restrain the adjustment of the proportional gain Kqp and the integral gain Kqi from being cancelled in a state where the overshoot of the q-axis actual current value Iq is large.

The overshoot of the q-axis actual current value Iq is caused not only by the rapid decrease in the reverse voltage due to the sudden stop of the motor 21, but also by the delay of the response of the q-axis actual current value Iq to the rapid decrease in the q-axis current command value Iq* due to the execution of the end-abutting relaxation control. When the adjustment start condition constituted by (a) to (c) described above is satisfied due to the overshoot caused by the responsiveness of the q-axis actual current value Iq, the proportional gain Kqp and the integral gain Kqi are adjusted so as to increase, and thereby the overshoot can be restrained.

In some cases, the absolute value of the q-axis current deviation ΔIq decreases once after the overshoot caused by the responsiveness of the q-axis actual current value Iq occurs as described above, and then the absolute value of the q-axis current deviation ΔIq increases again due to the occurrence of the overshoot caused by the rapid decrease in the reverse voltage. Therefore, for example, if the adjustment of the proportional gain Kqp and the integral gain Kqi is cancelled based on only the condition that the absolute value of the q-axis current deviation ΔIq is equal to or smaller than the second current deviation threshold ΔIth2, there is concern of repeat of increase and decrease in the values of the proportional gain Kqp and the integral gain Kqi. In this regard, in the embodiment, the cancellation condition includes the condition that the state where the proportional gain Kqp and the integral gain Kqi have been adjusted so as to increase continues for the predetermined time. Accordingly, the state where the proportional gain Kqp and the integral gain Kqi are large continues for the predetermined time. Therefore, it is possible to prevent the proportional gain Kqp and the integral gain Kqi from being frequently switched, and to restrain the steering feeling from being worsened.

The embodiment can be carried out while being modified as follows. The embodiment and the following modifications can be carried out while being mutually combined as long as there is no technical inconsistency.

In the above embodiment, when the cancellation condition constituted by (d) and (e) described above is satisfied, the adjustment of the proportional gain Kqp and the integral gain Kqi is cancelled. However, without being limited to this, when only the condition (d) or only the condition (e) is satisfied, the adjustment of the proportional gain Kqp and the integral gain Kqi may be cancelled, and the cancellation condition may include another condition.

In the above embodiment, when the adjustment start condition constituted by (a) to (c) described above is satisfied during the execution of the end-abutting relaxation control, the proportional gain Kqp and the integral gain Kqi are adjusted. However, without being limited to this, when the condition (a) is satisfied, the proportional gain Kqp and the integral gain Kqi may be adjusted, even when at least one of the condition (b) and the condition (c) is not satisfied. Further, the adjustment start condition may include another condition. Furthermore, instead of the condition (a), for example, it may be determined whether the q-axis actual current value Iq increases rapidly and the q-axis voltage command value Vq* decreases rapidly.

In the above embodiment, similarly to the q-axis current F/B control unit 93, the d-axis current F/B control unit 92 may adjust the proportional gain Kdp and the integral gain Kdi, when the overshoot of the d-axis actual current value Id occurs.

In the above embodiment, the manner of the current F/B computation that is performed by the q-axis current F/B control unit 93 can be modified when appropriate. The q-axis current F/B control unit 93 may perform a PID control computation, for example. Similarly, the d-axis current F/B control unit 92 may perform a PID control computation, for example.

In the above embodiment, by monitoring whether the motor 21 rotates even while the ignition switch is in the off-state, the steering control device 1 adds up the rotation number of the motor 21 from the starting point at all times, and computes the motor absolute angle. However, without being limited to this, for example, the steering control device 1 may be provided with a steering sensor that detects the steering angle as an absolute angle. The steering control device 1 may add up the rotation number of the motor 21 from the starting point, based on the steering angle detected by the steering sensor and the reduction ratio of the speed reducer 22, and may compute the motor absolute angle.

In the above embodiment, the steering control device 1 executes the end-abutting relaxation control, by limiting the assist command value Ias* to the steer angle limit value Ien. However, without being limited to this, for example, the steering control device 1 may execute the end-abutting relaxation control, by adding, to the assist command value Ias*, a steering reaction component that increases as the rack shaft 12 approaches the rack end position, that is, a component that has a sign opposite to the sign of the assist command value Ias*.

In the above embodiment, the steering control device 1 performs the guard process to the assist command value Ias*. However, without being limited to this, for example, the steering control device 1 may perform the guard process for a value resulting from correcting the assist command value Ias* with a compensation amount based on a torque differential value resulting from differentiating the steering torque Th.

In the above embodiment, the limit value setting unit 62 includes the voltage limit value computation unit 72 that computes the voltage limit value Ivb based on the source voltage Vb. However, without being limited to this, the limit value setting unit 62 may include another computation unit that computes another limit value based on another state quantity, in addition to or instead of the voltage limit value computation unit 72. Further, the limit value setting unit 62 may be configured to set the steer angle limit value Ien itself as the limit value Ig, without including the voltage limit value computation unit 72.

In the above embodiment, the steer angle limit value Ien may be a value resulting from subtracting only the angle limit component Iga from the rated current Ir.

In the above embodiment, the steering control device 1 controls the EPS 2, which is a type of steering device in which the EPS actuator 6 gives the motor torque to the column shaft 15. However, without being limited to this, for example, the steering control device 1 may control a type of steering device that gives the motor torque to the rack shaft 12 through a ball screw nut. Further, without being limited to the EPS, the steering control device 1 may control a steer-by-wire steering device in which dynamic power is not transmitted between a steering unit that is operated by the driver and a turning unit that turns turning wheels, and may execute the end-abutting relaxation control in the embodiment, for a torque command value or q-axis current command value of a motor of a turning actuator provided in the turning unit.

What is claimed is:

1. A steering control device comprising:
a control circuit configured to control a steering device and output a motor control signal, the steering device including a housing, a turning shaft contained in the housing so as to be capable of reciprocating, and an actuator configured to give motor torque by which the turning shaft reciprocates using a motor as a drive source,
the control circuit being configured to detect an absolute steer angle that is indicated by an absolute angle having a range beyond 360°, the absolute steer angle being a rotation angle of a rotation shaft and being capable of being converted into a turning angle of a turning wheel that is coupled to the turning shaft,
the control circuit being configured to compute a current command value corresponding to a target value of the motor torque to be output by the motor,
the control circuit being configured to perform a current feedback computation by which an actual current value of electric current to be supplied to the motor follows the current command value,
the control circuit being configured to generate the motor control signal,
the control circuit being configured to store an end position correspondence angle associated with the absolute steer angle, the end position correspondence angle being an angle indicating an end position where movement of the turning shaft is restricted by end abutting in which the turning shaft abuts on the housing,
the control circuit being configured to execute an end-abutting relaxation control to correct the current command value such that decrease in an end interval angle is controlled, when the end interval angle is equal to or smaller than a predetermined angle, the end interval angle indicating a distance of the absolute steer angle from the end position correspondence angle,
the control circuit being configured to adjust a control gain to be used in the current feedback computation, such that the control gain increases, when overshoot of the actual current value occurs during the execution of the end-abutting relaxation control;
the control circuit being configured to determine that the overshoot of the actual current value occurs, and adjust the control gain such that the control gain increases, when an adjustment start condition is satisfied during the execution of the end-abutting relaxation control, the adjustment start condition including a condition that an absolute value of a current deviation between the current command value and the actual current value is equal to or larger than a preset first current deviation threshold; and
a drive circuit configured to supply drive electric power to the motor based on the motor control signal.

2. The steering control device according to claim 1, wherein:
the control circuit is configured to compute a steer angle limit value that decreases based on the decrease in the end interval angle, when the end interval angle is equal to or smaller than the predetermined angle;
the control circuit is configured to set a limit value that is an upper limit of an absolute value of the current command value, to a value that is equal to or smaller than the steer angle limit value; and
the control circuit is configured to execute the end-abutting relaxation control by limiting the absolute value of the current command value to the steer angle limit value.

3. The steering control device according to claim 1, wherein the adjustment start condition includes a condition that an absolute value of an angular velocity of the motor is equal to or larger than a preset angular velocity threshold, in addition to the condition that the absolute value of the current deviation is equal to or larger than the preset first current deviation threshold.

4. The steering control device according to claim 1, wherein the adjustment start condition includes a condition that an absolute value of an angular velocity change amount of the motor is equal to or larger than a preset angular velocity change amount threshold, in addition to the condition that the absolute value of the current deviation is equal to or larger than the preset first current deviation threshold.

5. The steering control device according to claim 1, wherein the control circuit is configured to cancel the adjustment of the control gain, when a cancellation condition is satisfied after the control circuit adjusts the control gain such that the control gain increases.

6. The steering control device according to claim 5, wherein the cancellation condition includes a condition that the absolute value of the current deviation is equal to or smaller than a preset second current deviation threshold that is smaller than the preset first current deviation threshold.

7. The steering control device according to claim 5, wherein the cancellation condition includes a condition that a state where the control gain is large continues for a predetermined time.

* * * * *